United States Patent [19]

Sakurai

[11] 4,132,351
[45] Jan. 2, 1979

[54] REFLECTIVE OR TRANSMISSIVE OPTICAL READER

[75] Inventor: Yoshiyuki Sakurai, Shiojiri, Japan

[73] Assignee: Kabushiki Kaisha Suwa Seikosha, Tokyo, Japan

[21] Appl. No.: 742,394

[22] Filed: Nov. 15, 1976

[30] Foreign Application Priority Data

Nov. 13, 1975 [JP] Japan .............................. 50/136703

[51] Int. Cl.² .............................................. G06K 7/10
[52] U.S. Cl. .................................................. 235/454
[58] Field of Search ................. 235/61.11 E, 61.12 N, 235/440, 454; 250/566

[56] References Cited

U.S. PATENT DOCUMENTS

| 3,870,865 | 3/1975 | Schneiderham et al. ...... 235/61.11 E |
| 3,896,294 | 7/1975 | Schisselbauer et al. ....... 235/61.11 E |

*Primary Examiner*—Vincent P. Canney
*Attorney, Agent, or Firm*—Blum, Moscovitz, Friedman & Kaplan

[57] ABSTRACT

An information reader for reading both light transmissive and light reflective information from an information carrying medium such as a card is provided. The information reader is adapted to selectively dispose a card at a reading position. A transmissive light source is disposed on a first side of the reading position for directing light at the card to be transmitted therethrough. A reflective light source is disposed on the other side of the reading position for directing light at the medium to be reflected therefrom. A light sensitive transducer circuit is disposed proximate to the reading position on the same side of the medium as the reflective light source for detecting either the light transmitted through the medium when the reader is in a transmissive mode, or the light reflected from the medium when the reader is in a reflective mode. A mode selection switching circuit is coupled to the reflective light source, transmissive light source and light sensitive transducer for selectively energizing either the transducer and transmissive light source to dispose same into a transmissive mode of operation, or energizes the transducer and reflecting light source to dispose same into a reflective mode of operation.

6 Claims, 4 Drawing Figures

REFLECTIVE OR TRANSMISSIVE OPTICAL READER

BACKGROUND OF THE INVENTION

The instant invention is directed to an information reader for reading light transmissive or light reflective information from an information carrying medium, and in particular to a card reader utilizing the same light sensitive circuitry for detecting light reflected off of a card and light transmitted through openings in a card.

Heretofore, card readers capable of reading both reflective information from a card and transmissive information passed through the openings of a card have been characterized by the use of a single light source disposed on a first side of the card to be read, and two columns of light sensitive transducers. The first column of light sensitive transducers is utilized to detect the presence or absence of light reflected from the card and the second column of transducers is utilized to detect the presence or absence of light transmitted through the card. The respective photodetectors in each column of light sensitive transducers are coupled through a two position switch to an output amplifier, thereby requiring a two contact switch for each column of information to be read, thereby complicating the coupling of the output amplifier circuits to the respective photodetectors, and additionally, preventing the miniaturization and simplification of the card reader. Accordingly, a card reader eliminating the aforementioned disadvantages is hereinafter described.

SUMMARY OF THE INVENTION

Generally speaking, in accordance with the invention, an information reader for reading light transmissive or light reflective information from an information carrying medium, is provided. The information reader includes a suppport member for selectively disposing an information carrying medium at a reading position. A transmissive light source is disposed on a first side of the reading position for directing light at a medium to be transmitted therethrough. A reflective light source is disposed on the other side of the reading position for directing light at the medium to be reflected therefrom. A light sensitive transducer is disposed proximate to the reading position on the same side of the medium as the reflective light source, the light sensitive transducer being adapted to detect the light transmitted through the medium when the reader is in a transmissive mode and the light reflected from the medium when the reader is in a reflective mode. The light sensitive transducer is adapted to produce a light sensitive signal representative of the amount of light transmitted through the medium when the reader is in a transmissive mode and the amount of light reflected from the medium when the reader is in a reflective mode. A mode selection switching circuit is coupled to the reflective light source, transmissive light source and light sensitive transducer for selectively energizing either the transducer and transmissive light source to dispose the reader in a transmissive mode, or the transducer and reflective light source to dispose the reader in a reflective mode.

Accordingly, it is an object of this invention to provide an improved information reader for reading light transmissive or light reflective information from an information carrying medium.

Another object of the instant invention is to provide an improved card reader for reading light information transmitted through openings in the card or, alternatively, for reading light information reflected from the card.

Still another object of the instant invention is to provide an improved information reader having a single column of light sensitive transducers for both transmissive and reflective operation.

Still a further object of the instant invention is to provide a simple, less expensive and improved light transmissive and light reflective card reader.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
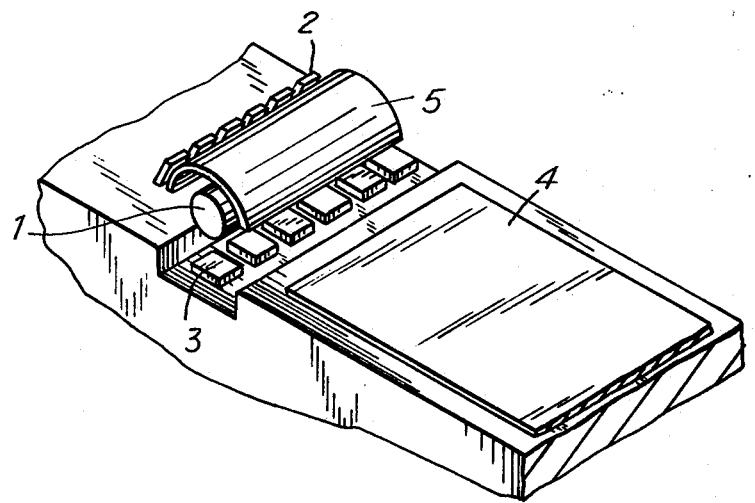
FIG. 1 is a perspective view of a card reader constructed in accordance with the prior art.

Reference is now made to FIG. 1, wherein the operative components of a card reader constructed in accordance with the prior art are depicted. Specifically, a reading position for a card carrying coded information is defined by a lamp 1, which lamp defines a light source for reading information in a light reflecting mode or in a light transmitting mode. A plurality of photoelectric transducers 2 are positioned to detect the amount of light reflected from the card 4 when same is disposed at a reading position. A second plurality of photoelectric transducers are disposed on the opposite side of the card 4, when same is at a reading position, to detect the amount of light transmitted through openings formed in the card 4 when the card reader is disposed in a light transmissive mode. It is noted that the photoelectric transducers 2 and 3 can be formed of any light sensitive means such as photodetectors, photomultipliers, solar batteries or the like. A cover 5 is disposed over the lamp 1 in order to direct the light supplied by the lamp to the reading position of the card reader. Because the instant invention is characterized by the relationship of the aforedescribed elements, the specific means for structurally supporting the operative elements, which structural means are conventional, have been omitted to simplify the discussion herein.

As utilized herein, the terms "transmissive mode" and "reflective mode" refer to the type of information carrying card that is utilized. For example, if the card 4 is a punch card, in a light transmissive system, the amount of light that passes through the openings in the card is measured. In such a system, the photoelectric transducer 3 is normally referenced to produce a low voltage output when the card 4 is disposed between the lamp 1 and the photodetectors 3, unless an opening in the punch card 4 permits light to be transmitted to the photoelectric transducer. Accordingly, when a punch hole is disposed between the lamp 1 and a photoelectric transducer 3, the photoelectric transducer detects the light and produces a high voltage level signal. Alternatively, if the card 4 is not a punch card, but instead is a marked card, wherein the marks are formed by a dark pencil, or any other conventional writing implement such as a pen, the photoelectric transducers 2 are utilized to detect the amount of light reflected off the card 4. In such an event, the card reader operates in a reflective mode, and the output voltage of the photoelectric transducers 2 are normally referenced to produce a high voltage level signal in response to the light being reflected from the card 4, and produce a low voltage level signal in response to less light from the lamp 1 being reflected to the photoelectric transducer 2 because of the light from the lamp 1 being absorbed by the dark marks on the card.

Accordingly, the photoelectric transducers 3 are normally referenced to a low voltage when the card reader is in a transmissive mode, whereas the photoelectric transducers 2 are normally referenced to a high voltage when the card reader is in a reflective mode. Thus, the logic circuitry required for processing the information produced by the light transmissive photoelectric transducers 3 and the logic circuitry for processing the signal produced by the light reflective photoelectric transducers 2 are 180° out of phase with respect to each other. Therefore, as is illustrated in FIG. 2, the connections of the photoelectric transducers must be logically inverted in order to utilize same in the same card reader.

Figure 2:
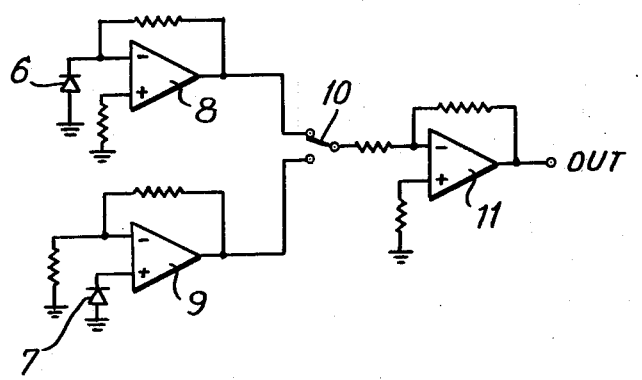
FIG. 2 is a circuit diagram of a circuit for the card reader depicted in FIG. 1.

Reference is now made to FIG. 2, wherein a circuit diagram of a conventional reading circuit for a light transmissive and light reflective card reader, of the type depicted in FIG. 1, is illustrated. A light reflective photoelectric transducer 6 is coupled to the negative (−) terminal of operational amplifier 8, which amplifier is coupled through a first contact of a switch 10 to the negative (−) input of an output amplifier 11. Light reflective photoelectric transducer 7 is coupled to the positive (+) input of operational amplifier 9, which amplifier is coupled through a second contact of switch 10 to the negative (−) input of output amplifier 11. Output amplifier 11 is an operational amplifier for performing a wave shape function. Accordingly, when the card reader is in a light-reflective mode of operation, switch 10 couples the output of operational amplifier 8 to the wave shaping amplifier 11 to thereby produce a signal OUT representative of the light detected by the photoelectric transducer 6. Alternatively, when the card reader is in a light-transmissive mode of operation, the switch 10 couples the output of operational amplifier 9 to the output amplifier 11 to produce a signal OUT representaive of the changes in transmitted light detected by the transducer 7. Thus, by providing a negative logic coupling of the photoelectric transducer 6, to the operational amplifier 8, and a positive logic coupling of the light-transmissive photoelectric transducer 7 to the operational amplifier 9, the out of phase relationship of the respective photoelectric transducers and circuitry for processing the information produced thereby, when the card reader is converted from reading cards having marks thereon to cards having punch holes formed therein, is effected.

Nevertheless, among the disadvantages that inure to such a card reader is the expense of providing two columns of photoelectric transducers, one for detecting light-transmissive information punched into a card, and the other for detecting light-reflective information marked on a card. Additionally, an amplifier is needed for each photoelectric transducer, which amplifier and transducer remain inactive when the card reader is in the other mode. Thus, providing a photosensitive transducer and amplifier for each bit of information to be read in both the light-reflective and light-transmissive modes adds to the expense and complexity of such card readers. Moreover, in order to utilize the same output amplifier 11 with both of the input amplifiers 8 and 9, it is necessary to provide a multicontact switch for each bit of information that is provided in the column of photoelectric transducers. For example, if twenty bits of information are provided in each column of photoelectric transducers (20 light-reflective transducers 2 and 20 light-transmissive transducers 3), twenty double contact switchs 10 must be provided for converting the card reader from and to a light-transmissive mode of operataion and light-reflective mode of operation. The large number of double contact switches required in such a card reader not only increases the complexity of the card reader, but additionally prevents miniaturization thereof. As is detailed hereinafter, the instant invention is particularly characterized by the elimination of the aforenoted disadvantages.

Figure 3:
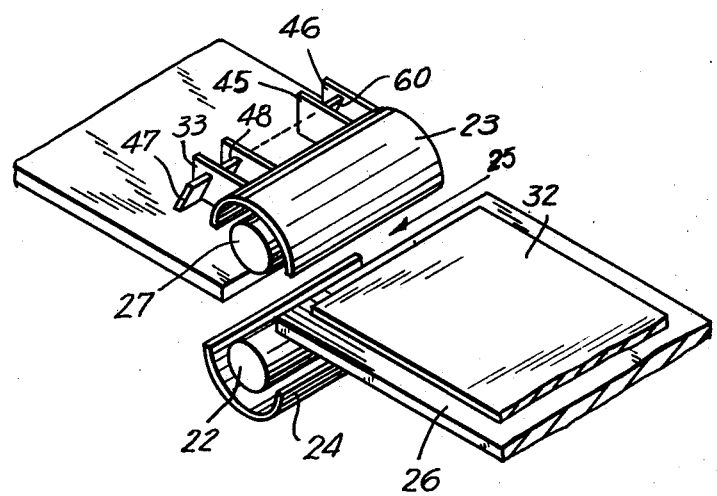
FIG. 3 is a perspective view of a card reader constructed in accordance with a preferred embodiment of the instant invention.
Figure 4:
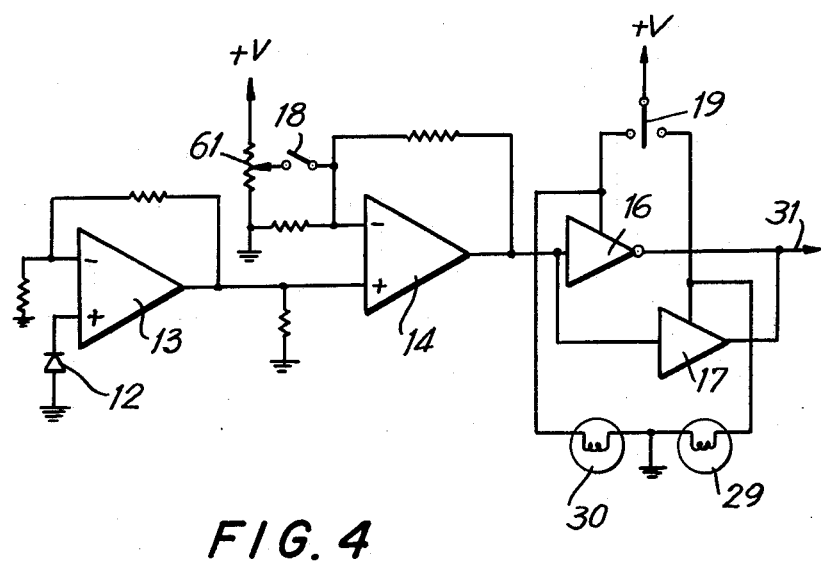
FIG. 4 is a circuit diagram of a circuit for the card reader depicted in FIG. 3.

Reference is now made to FIGS. 3 and 4, wherein the operative elements of a card reader, and the circuitry for a card reader, constructed in accordance with the instant invention, are respectively depicted. The operative elements of the card reader, depicted in FIG. 3, include a light-reflective lamp 2/ disposed above the reading position of the card reader, and a light-transmissive lamp 22 disposed below the reading position of the card reader. Covers 23 and 24 are respectively provided for the lamps 27 and 22 for insuring that the light produced thereby is directed to the reading position 25 defined by an opening formed in the bed 26 for supporting the information card 32. A single column of photoelectric transducers 47 through 60 are disposed at a position to detect light reflected from the card 32 when the card is at a reading position, and additionally, to detect light transmitted through holes punched in the card 32 when the card is at a reading position. Each of the transducers 47 through 60 is separated by a parting shield 33 through 46, which parting shield prevents the light incident upon the adjacent transducers from being inadvertently detected. Accordingly, when the card 32 contains marked information thereon, the card reader operates a light-reflective mode whereby the light produced by the lamp 27 is directed on the portion of the card disposed at the reading position 25, and is detected by the photodetectors 47 through 60. Alternatively, if the card 32 contains holes punched therein, the card reader operates in a light-transmissive mode of operation whereby the light produced by lamp 22 is directed through the openings in the card 32 disposed at the reading position 25, and are detected by the photoelectric transducers 47 through 60. When the card reader is in a light-reflective mode, the photoelectric detector must be normally referenced at a high voltage level and produce a low voltage level in response to the light produced by lamp 27 being absorbed by the mark on the card. Alternatively, when the card reader is in a light-transmissive mode, the photodetectors 47 through 60 will normally be referenced to a low voltage level, and will produce a high voltage level in response to an opening in the card permitting the light to be transmitted to the photoelectric transducer. Accordingly, the output of the transducers are the same as those discussed above with respect to the prior art transducers. Thus, the card reader depicted in FIG. 3 is particularly characterized by the use of the same photoelectric transducer when the card reader is operating in both the light-transmissive mode and in the light-reflective mode, to thereby eliminate the necessity of providing twice the number of photoelectric transducers as the number of bits of information in the column to be read.

Referring particularly to FIG. 4, the manner in which a single photoelectric transducer can be utilized for both modes of operation in accordance with the instant invention, is depicted. A single photoelectric transducer 12 is coupled to the positive (+) input of operational amplifier 13, which amplifier 13 and photoelectric transducer 12 apply at least a two voltage level signal to the positive (+) input of operational amplifier 14. A feedback resistor and negative (+) input of operational amplifier 14 are coupled through a resistor 61 and switch 18 to the DC supply voltage $+\overline{V}$, in order to adjust the reference voltage level at which the operational amplifier 14 operates, and thereby vary the output voltage levels of the signals produced thereby. The output of operational amplifier 14 is coupled to the input of logic gate 16 and logic gate 17, which logic gates are respectively coupled through switch 19 to the DC voltage supply $+\overline{V}$. Light-transmissive lamp 30 is coupled in parallel with logic gate 16 and light-reflective lamp 29 is coupled in parallel with logic gate 17. It is noted that logic gate 16 is adapted to produce an output that is inverted with respect to the output of logic gate 17 at output terminal 31.

In operation, if a light-transmissive reading mode is selected, switch 19 couples the voltage supply $+\overline{V}$ to logic gate 16 and lamp 30, to thereby provide an output signal 31 representative of the signal produced at the output of logic gate 16. At this time, the logic gate 17 and lamp 29 are turned OFF, and hence have no influence upon the output produced at terminal 31. Since the card reader is in a light-transmissive mode, the output voltage of the photoelectric transducer 12 is normally referenced to a LOW voltage level, and when a hole in the card is detected, the output level of the photoelectric transducer 12 is referenced to a HIGH voltage level. Accordingly, this voltage level is applied through the positive logic connection of the wave shaping amplifier 14 to the logic gate 16, which inverts same and produces a LOW voltage level at the output terminal 31. Alternatively, if the card reader were disposed in a light-reflective mode, the switch 19 would couple the voltage supply $+\overline{V}$ to logic gate 17 and lamp 29, and cause the output produced by the photoelectric transducer 12 to be normally referenced to a HIGH voltage level. Thus, when the card reader is operating in a light-reflective mode, the HIGH voltage level signal produced by photoelectric transducer 12 and operational amplifier 13 would be shaped by operational amplifier 14 and applied to logic gate 17 and have a HIGH voltage level at the output terminal 31. Additionally, when absorbed light is detected by the photoelectric transducer 12, the output produced by the logic gate 17 would be a LOW voltage level signal. Accordingly, in either mode of operation, the lamp and logic gate for producing the output signal in the mode not selected is decoupled from the circuit and, hence, does not hinder the operation of the mode selected. Moreover, the operational amplifiers 13 and 14 and the logic gates 16 and 17 can be integrated to a single IC chip, with a single switch 19 utilized to effect conversion between the light-transmissive mode and the light-reflective mode. Also, the switch 18 utilized to adjust the respective voltage levels produced by the wave shaping circuit 14 can be coupled to the switch 19 in a conventional double-throw relationship, in order to select the respective voltage levels to be produced at the output of the operational amplifier 14 for the respective light-transmissive and light-reflective modes of operation selected.

Accordingly, the instant invention is particularly characterized by the photoelectric transducers being utilized for both light-reflective reading and light-transmissive reading, thereby eliminating the second column of photoelectric transducers that characterize the prior art. In addition to eliminating the expense of the additional photoelectric transducers, the number of amplifier circuits is equally reduced. Moreover, since changeover of the logic is effected at the same time that the changeover in mode of operation is effected, and such changeover is effected by a single switch having two contacts, the reader circuitry is rendered more simple, less expensive to manufacture, and more readily miniaturized.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An information reader for reading light-transmissive or light-reflective information for an information carrying medium comprising support means for selectively disposing said medium at a reading position, transmissive light source means disposed on a first side of said reading position for directing light at said medium to be transmitted therethrough, reflective light source means disposed on the other side of said medium for directing light at said medium to be reflected therefrom, and light sensitive transducer means disposed proximate to said reading position on the same side as said reflective light source means, said light-sensitive transducer means including a photoelectric detector means adapted to detect said light transmitted through said medium when said reader is in a transmissive mode and said light reflected from said medium when said reader is in a reflective mode and in response thereto produce at least a two voltage level output signal representative of one of the absence and presence of light transmitted through the medium and the amount of light reflected from said medium, mode selection switching circuit means coupled to said reflective light source means and said transmissive light source means for alternatively and selectively energizing one of said transmissive light source to dispose said reader in a transmissive mode and said reflective light source means to dispose said reader in a reflective mode, said transducer means including first and second logic means, coupled to said switching circuit means, said first logic means and said reflective light source means being coupled in parallel to each other and in series with said switching circuit means for producing a light sensitive signal having first and second voltage levels corresponding respectively to the absence and presence of reflected light detected by said transducer means in response to said output signal when said reader is disposed in a reflective mode, said second logic means and said transmissive light source means being coupled in parallel to each other and in series with said switching circuit means for producing a light sensitive signal having a first and second voltage level respectively corresponding to the presence and absence of light detected by said transducer means in response to said output signal when said reader is disposed in a transmissive mode, and amplifier-wave shaping circuit means disposed intermediate said photoelectric detector means and said logic means for shaping and amplifying the voltage level output signal produced by said photoelectric detector means and applying same to one of said respective first and second logic means.

2. An information reader as claimed in claim 1, wherein said second and first voltage levels are high and low voltage levels, respectively.

3. An information reader as claimed in claim 2, wherein said light sensitive transducer means includes photoelectric detector means for detecting the amount of light transmitted through said medium when said reader is in a transmissive mode and for detecting the amount of light reflected off said medium when said reader is in a reflective mode, said photoelectric detector means being adapted to produce at least a two voltage level output signal responsive to the absence or presence of light detected thereby, and amplifier-wave shaping circuit means disposed intermediate said photodetector means and said logic means for shaping and amplifying the voltage level output signal produced by said photoelectric detector means and applying same to one of said respective first and second logic means.

4. An information reader as claimed in claim 1, wherein said amplifier-wave shaping means includes voltage levels selecting means for selecting the respective high and low voltage levels of said two-level output signals applied to said logic means, said voltage level selecting means being coupled to said switching circuit means for selectively referencing said first pair of high and low voltages produced by said first logic means when said reader is in a reflective mode and said first and second voltage levels produced by said second logic means when said reader is in a transmissive mode.

5. An information reader as claimed in claim 1, wherein said light-sensitive means includes a plurality of photoelectric detector means, each said photoelectric detector means being adapted to produce a two voltage level signal representative of changes in the reflective and transmissive light detected thereby, both of said first logic means and second logic means including a plurality of logic gates associated with each photoelectric detector means for producing a first and second voltage level signal in response to said two voltage level signals produced by said photodetector associated therewith.

6. An information reader as claimed in claim 1, wherein each of said photoelectric detector means are disposed in an adjacent relationship to define a column, and including light shields disposed between each said adjacent photoelectric detector means for shielding the light incident upon the adjacent photoelectric detector means from said photoelectric detector means.

* * * * *